F. FUNK.
WAGON-BRAKE LEVER.

No. 182,184. Patented Sept. 12, 1876.

WITNESSES:

INVENTOR:
Frank Funk
BY
ATTORNEYS.

UNITED STATES PATENT OFFICE.

FRANK FUNK, OF BEVERLY, ILLINOIS.

IMPROVEMENT IN WAGON-BRAKE LEVERS.

Specification forming part of Letters Patent No. 182,184, dated September 12, 1876; application filed August 11, 1876.

*To all whom it may concern:*

Be it known that I, FRANK FUNK, of Beverly, in the county of Adams and State of Illinois, have invented a new and useful Improvement in Wagon-Brakes; and I do hereby declare the following to be a full, clear, and exact description of the same, reference being had to the accompanying drawing, in which—

Figure 1:
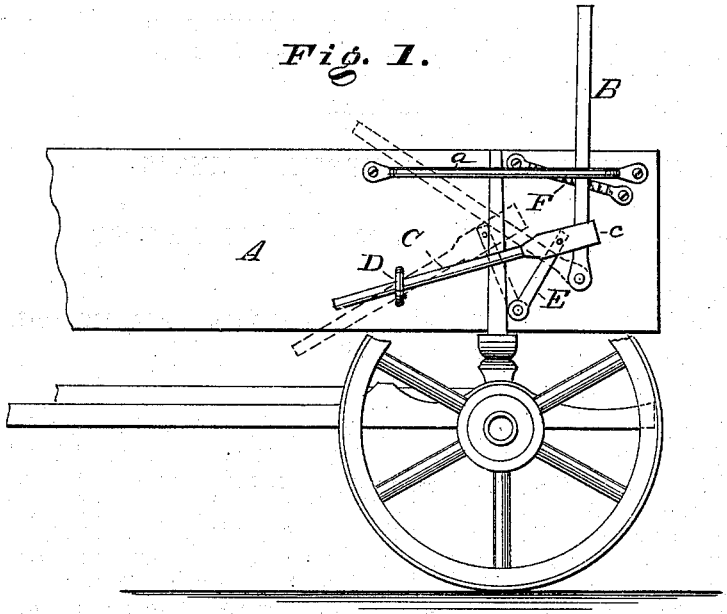
Figure 2:
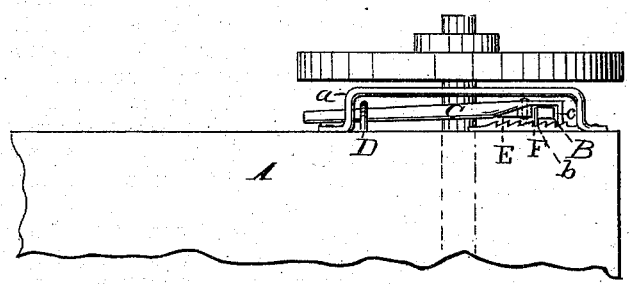
Figure 3:
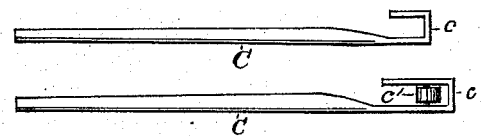

Figure 1 represents a side view of my invention applied to a wagon. Fig. 2 is a plan of the same. Fig. 3 represents certain details of portions of the invention.

The invention consists of a lever connected with a fulcrum-bar and brake-rod, all so arranged that the power is gradually increased as the brake is pulled by the brake-rod connected with it against the wheel. The impelling-lever is provided with a longitudinal projection or detent to lock the brake by engaging with a rack-bar attached to the side of the wagon, and is connected with the other parts, as hereinafter more fully described.

In the accompanying drawings, A represents the side of a wagon or other vehicle, with bar $a$ attached for controlling and guiding the impelling-lever B, which pivots at its lower end to the side of the wagon. C is the brake-rod attached to the brake at its forward end, sliding through the staple D, which aids in directing it, and with its rear end $c$ bent around the lever B. The bent portion $c$ slides up or down said lever as the latter is moved forward or backward, and may be provided with a friction-roller, $c'$, or not, as shown by the two views in Fig. 3. E is the fulcrum-bar, pivoted at its lower end to the wagon side below and in front of the pivot of the lever B, and at its upper end to the brake-rod, immediately in front of said lever. F is the rack-bar, upon which the detent $b$ fixed to the lever B engages, and thus locks the brake.

The brake-rod C sliding freely on the lever B, and being pivoted to the fulcrum-bar E, its rear end must necessarily follow the circle of motion of the latter. Hence, when the lever B is at its extreme forward limit, the brake-bar C is at its highest point on said lever; because then the point of junction between B, C, and E is at its least distance from the lower pivot of E relative to its distance from the pivot of B. As the lever B is pulled backward, this relative distance constantly increases until at the extreme backward limit of the lever B it is greatest, and the brake-bar is at its lowest point on said lever. The bent portion $c$ of the brake-bar being the fulcrum of the lever B, the leverage must be greatest when it is at its lowest, and least when it is at its highest, position on said lever. Thus the power increases continually as the brake is drawn back.

It will be seen that the rack-bar F is so placed as to come into action when the brake is pressing against the wheel and the leverage is greatest.

Having thus described my invention, what I claim as new, and desire to secure by Letters Patent, is—

In a wagon-brake, the combination of the pivoted lever B, sliding brake-rod C, and pivoted fulcrum-bar E, substantially as shown and described, for the purpose specified.

FRANK FUNK.

Witnesses:
 JOHN G. SYKES,
 WILLIAM SYKES.